United States Patent Office 3,013,674
Patented Dec. 19, 1961

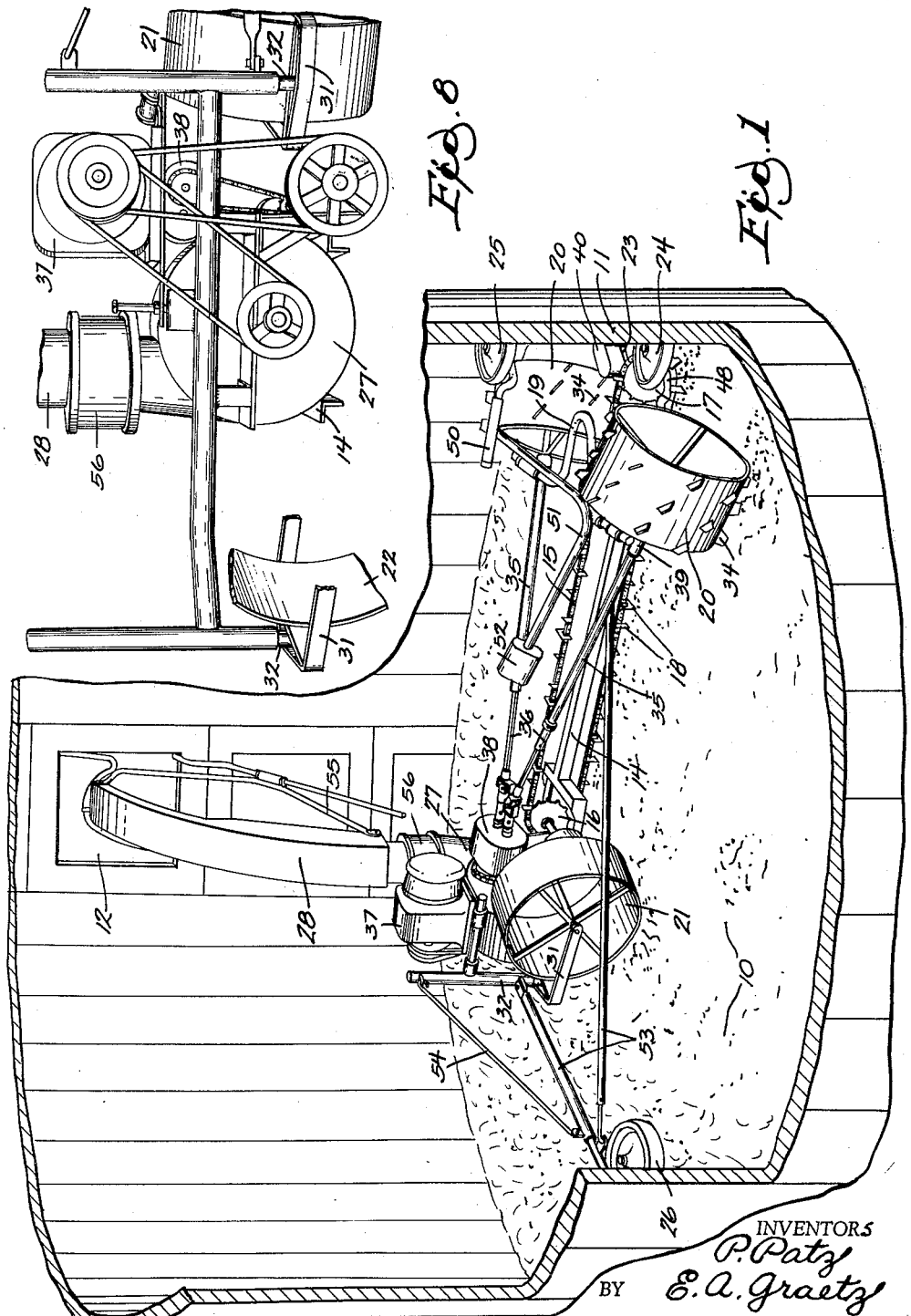

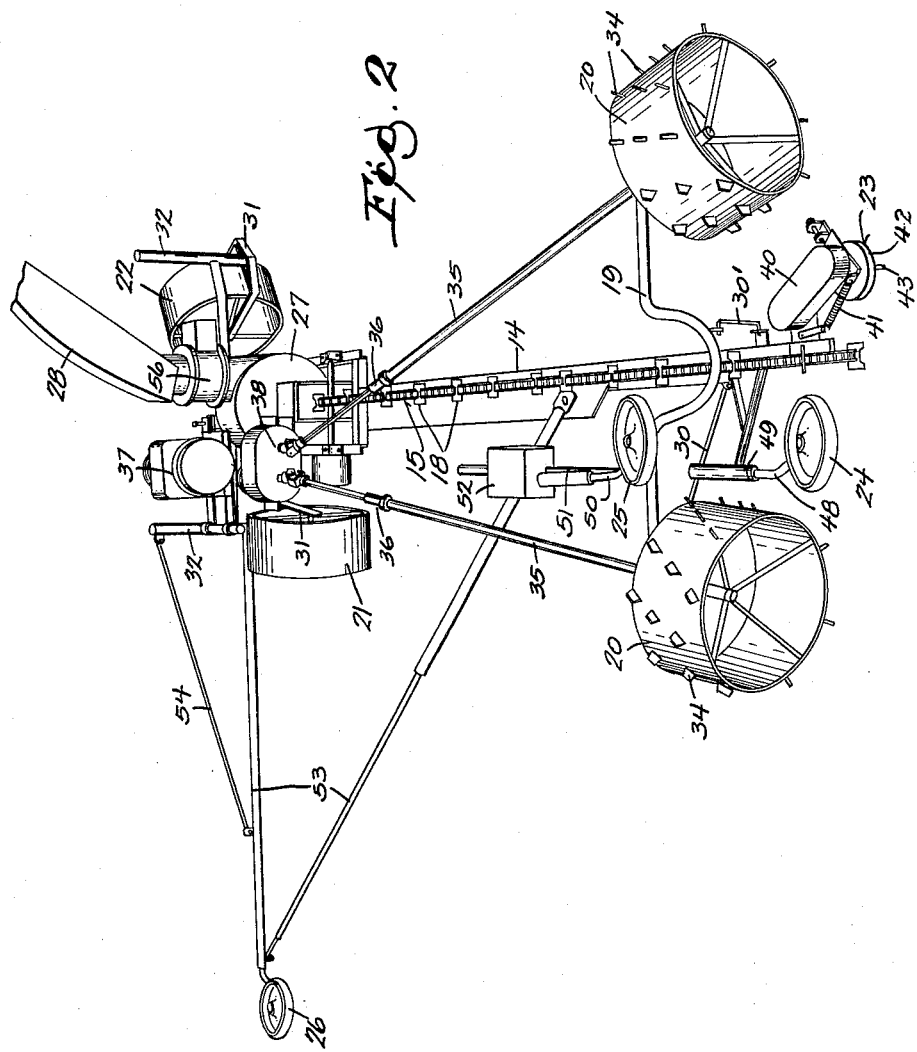

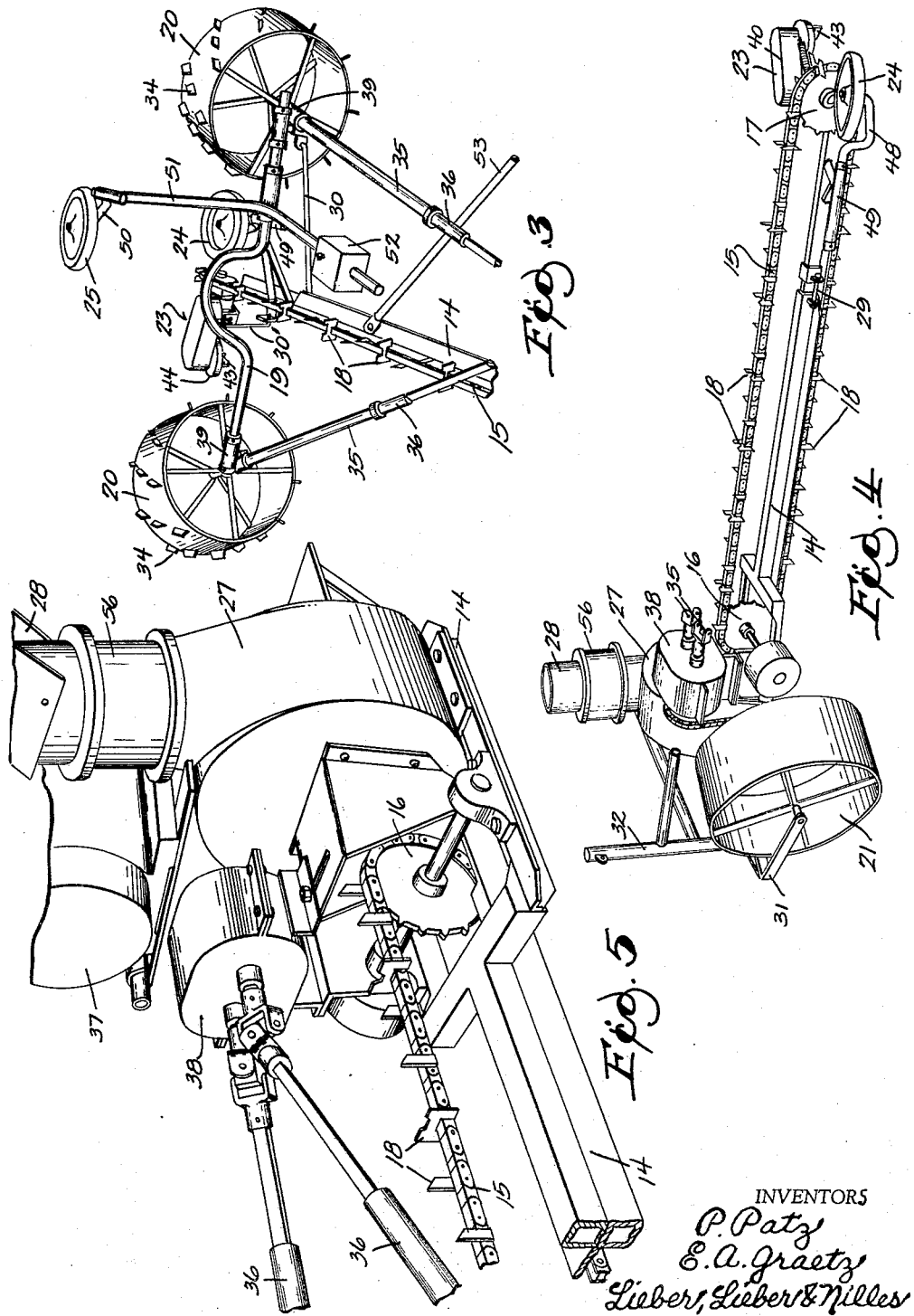

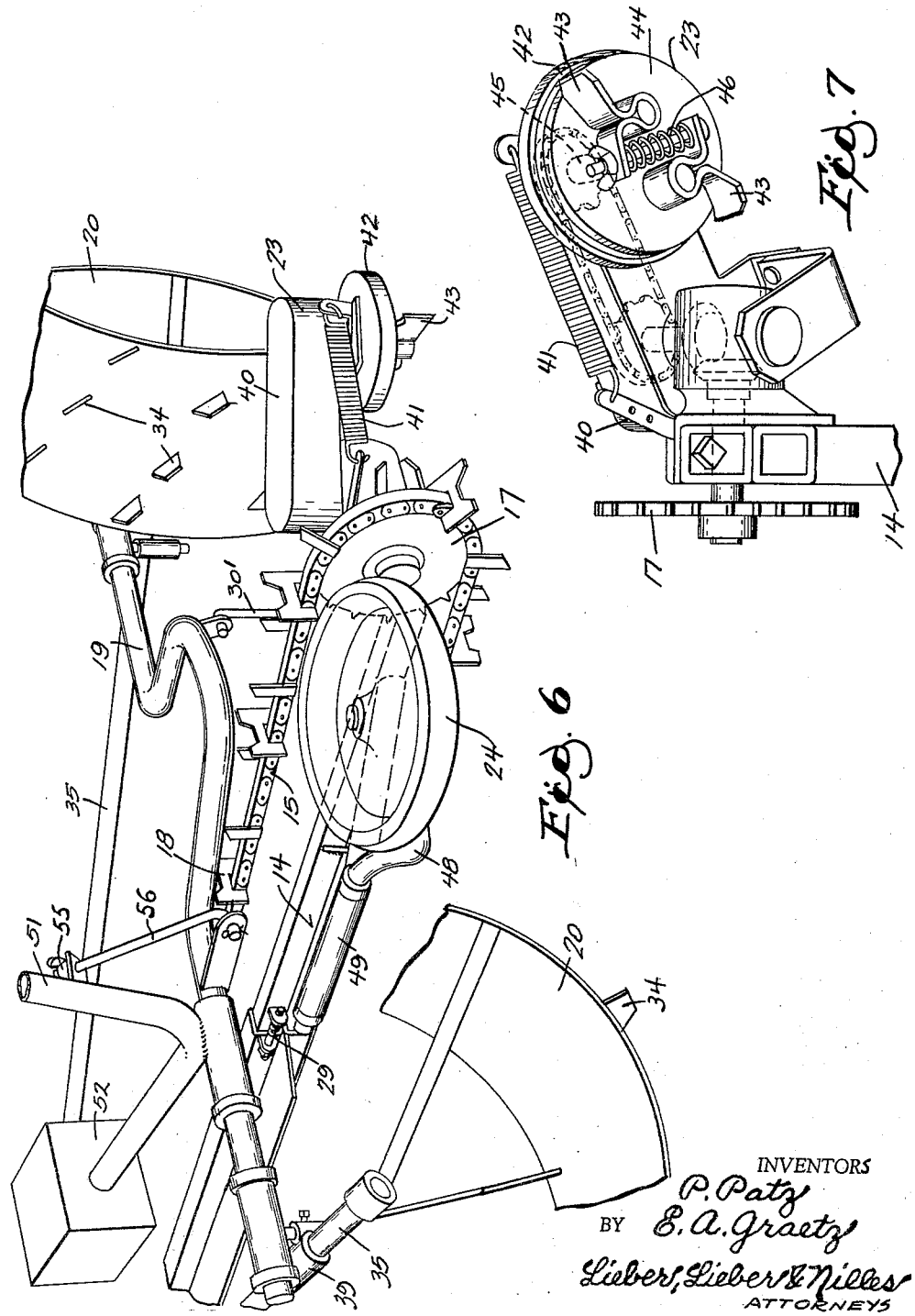

3,013,674
SILAGE UNLOADING MECHANISM
Paul Patz and Edward A. Graetz, Pound, Wis.
Filed Aug. 3, 1959, Ser. No. 831,362
5 Claims. (Cl. 214—17)

This invention relates generally to improvements in devices for delivering bulk material from within storage receptacles, and it relates more particularly to improvements in the construction and operation of mechanism for automatically unloading fodder such as ensilage from enclosures such as upright silos.

The principal object of the invention is to provide various improvements in silage unloaders whereby the durability and efficiency thereof is enhanced to a maximum.

As shown and described in our copending application Serial No. 602,193, filed August 6, 1956, it has heretofore been proposed to provide a top unloader for automatically removing ensilage from within an upright silo with the aid of an elongated endless chain conveyor resting upon the silage mass and which is revolved radially about the central silo axis by drive wheels disposed on the opposite sides of and in close proximity to the swinging end of the conveyor and which cooperate with an idler wheel located near said axis to provide a three point support for the conveyor supporting frame. This prior device was also provided with a bladed rotor suspended from the outer end of the conveyor supporting frame and adapted to prevent silage from adhering to the inner silo surface, and this rotor as well as the conveyor and the drive wheels were all driven by a common electric motor mounted directly upon the revolving outer end of said frame. While this previous silage unloader was relatively successful in commercial operation, it involved some undesirable objections and complications especially in the mechanism for driving the various parts of the unit and in properly supporting the assemblage upon the ensilage mass.

It is therefore an important object of the present invention to obviate these objectionable features of our prior silage unloading unit, by improving and simplifying the driving mechanism and the general assemblage.

Another important specific object of this invention is to provide an improved main and auxiliary frame assemblage for the endless silage conveyor and for the drive wheels which revolve this conveyor about the central silo axis, and which enables the conveyor and these drive wheels to effectively conform to and coact with irregularities in the top of the silage mass independently of each other.

Another important object of the present invention is to provide a simple but durable automatic ensilage unloader which can be quickly installed or removed and which is adapted to float on uneven and diversely compacted silage masses and to constantly remove the fodder at any desired rate with minimum attention and loss of time.

These and other more specific objects and advantages of the invention will be apparent from the following detailed description.

A clear conception of the improvements constituting the present invention, and of the construction and operation of a silage unloading mechanism embodying the same, may be had by referring to the drawings accompanying and forming a part of this specification wherein like reference characters designate the same or similar parts in the various views.

FIG. 1 is a side perspective view of one of the improved silo unloaders cooperating with the top of a mass of ensilage confined within a fragment of a circular upright silo portions of the annular wall of which have been broken away to reveal substantially all of the unloading unit;

FIG. 2 is another perspective view of the same silage unloader alone, but looking downwardly and inwardly along the elongated ensilage conveyor toward the driving mechanism of the unit;

FIG. 3 is still another perspective view of the outer revolving end portion of the same unit, but looking downwardly and outwardly toward this end;

FIG. 4 is an additional perspective view of the ensilage conveyor of the same unloader, looking downwardly and sidewise toward the main frame and conveyor;

FIG. 5 is an enlarged fragmentary perspective view of the central propelling end of the unit, showing the driving mechanism for the conveyor, drive wheels and ensilage discharge blower;

FIG. 6 is a similarly enlarged fragmentary perspective view of the outer swinging or revolving end of the silo unloader, showing the relative positions of the adjacent end of the silage conveyor and cutting rotor and of the drive wheels and guide rollers;

FIG. 7 is a further enlarged bottom perspective view of the ensilage cutting rotor and its driving connection with the outer conveyor sprocket; and FIG. 8 is another fragmentary perspective view of the inner propelling end of the unloading device, looking at the driving mechanism of FIG. 5 at a different angle.

While the invention has been shown and described herein as having been embodied in an electric motor driven silage unloading unit involving specific types of drives for propelling the various power actuated elements, it is not intended to limit the improvement by virtue of this restricted embodiment; and it is also contemplated that specific descriptive terms employed herein be given the broadest possible interpretation consistent with the actual disclosure.

Referring to the drawings, the improved silage unloader shown therein is of the type adapted to rest upon and remove ensilage 10 from the top of the mass confined within the annular silo wall 11, and to deliver the removed bulk material away from the central silo axis through a vertically elongated opening 12 in the confining wall. This silage unloader as shown in FIGS. 1 and 2, comprises in general an elongated main frame 14 radiating from and revolvable about the silo axis; an elongated endless chain conveyor 15 coacting with inner and outer sprockets 16, 17 journalled in the frame 14 and having outwardly and inwardly movable upper and lower stretches provided with teeth 18 for transporting ensilage 10 toward said axis; an auxiliary frame 19 disposed above and spanning the outer swingable end of the main frame 14; a positive drive wheel 20 journalled for rotation on each of the opposite ends of the auxiliary frame 19 in close proximity to the outer end of the conveyor 15; a pair of caster wheels 21, 22 pivotally secured to the inner end of the main frame 14 closely adjacent to and on opposite sides of the silo axis; an ensilage cutting rotor 23 carried by the outer end of the revolvable main frame 14 and adapted to be driven from the outer conveyor driving sprocket 17; a lower guide roller 24 and an upper leveling depth roller 25 carried by the frames 14, 19 respectively and being cooperable with the inner surface of the silo wall 11 between the drive wheels 20; another leveling depth roller 26 also carried by the main frame 14 and being cooperable with said inner silo surface remote from the rollers 24, 25; a blower 27 mounted upon the inner end of the main frame and being adapted to deliver silage from the silo interior through a non-rotatable conduit 28 directed through the opening 12; and driving mechanism for the conveyor 15, wheels 20 and blower 27 supported upon the inner end portion of the main frame 14.

The main frame 14 comprises a pair of radial telescoping rigid beams which are relatively adjustable by means of a bolt 29 shown in FIG. 4, to vary the radial length of this frame and the distance between the sprockets 16, 17 in order to properly tension the chain conveyor 15 and to also adapt the unit for use in silos of different diameters in which case the number of links in the chain may be varied to suit. The auxiliary frame 19 may be formed of durable rod stock with its medial portion bent into U-shape to form a crank which is connected to the main frame by a link 30', while one end of the frame 19 is also connected to the main frame 14 by another link 30. As long as the conveyor 15 is disposed perpendicular to the silo wall 11 and the top of the silage is level, there is no action by the links, but if the drive wheels 20 engage a low spot the upper leveling depth roller 25 causes the auxiliary frame 19 to lift conveyor 15, whereas if the wheels 20 hit a high spot the roller 25 causes the conveyor 15 to drop and dig into the ensilage. This relative movement between the drive wheels 20 and the outer end of the conveyor 15 is transmitted through the links 30, 30' which permit the wheels to ride upon the ensilage 10 independently of this conveyor. The two caster wheels 21, 22 are mounted in brackets 31 which are swingable about upright pivots 32 toward and away from the enlarged inner end of the frame 14 and ride upon the ensilage 10 adjacent to the silo axis to support the weight of the elements mounted upon this end of the main frame while also providing a four point support for the entire unit, see FIG. 2.

As shown in FIGS. 1, 2 and 3, the drive wheels 20 are preferably provided with peripheral cleats 34 adapted to dig into the ensilage 10 so as to effect positive rotation of the conveyor 15 about the central silo axis, and each of the wheels 20 is attached to the outer end of a propelling shaft 35, each of which is adjustable in length by means of a medial coupling sleeve 36, and the inner ends of which are drivingly connected to a propelling motor 37 through universal couplings and a speed reducer 38 while their outer end portions are journalled in bearings 39 carried by the adjacent ends of the transverse frame 19. The ensilage cutting rotor 23 which is carried by the outer swinging end of the main frame 14 is journalled for rotation in one end of an elongated housing 40 the opposite end of which is pivotally secured to this frame end, and this housing is constantly urged to swing outwardly about its pivot by a tension spring 41 the tension of which is variable so as to urge the rotor 23 outwardly with selected pressures against the inner annular surface of the silo wall 10.

The cutting rotor 23 is of improved construction as shown in FIGS. 6 and 7 and comprises a pair of diametrically opposite cutter blades 43 detachably secured to a disk 44 located beneath the outer end guard 42 carried by the housing 40 and adapted to be revolved by a shaft 45 positively driven from the outer end sprocket 17 of the conveyor 15 by gearing confined within the housing 40, so as to cause the rapidly revolving blades 43 to shear ensilage 10 from the inner surface of the silo wall 11 and from the top of the silage mass adjoining this surface and to throw this ensilage into the outer end of the path of the main conveyor 15. The rotor blades 43 may be rigidly or pivotally attached to the disk 44 and the outer ends of these blades should be maintained within the guard 42 by a spring 46 or otherwise in order to prevent the blades from striking the inner silo surface which is not always perfectly circular, in which case the guard 42 will guide the rotor 23 so as to compensate for irregularities.

The improved construction and disposition of the lower guide roller 24 and of the leveling rollers 25, 26 is also important in order to cause the cutting rotor 23, the conveyor 15 and the driving wheels 20 to properly cooperate with the ensilage mass and to remain centralized relative to the silo axis. All of these rollers normally travel in approximately horizontal paths along the inner annular surface of the silo wall 11, and the lower roller 24 is journalled upon the outer end of a rod 48 which is adjustable longitudinally within a bracket 49 secured to the swinging end of the main frame 14, while the upper roller 25 is journalled upon the outer end of a similar rod 50 which is adjustable longitudinally within one arm of a crank shaped bracket 51 the other arm of which carries an adjustable weight 52 and its medial portion is adjustably and swingably suspended upon the auxiliary frame 19, see FIG. 6. The lower roller 24 therefore guides and stabilizes the main frame 14 and cutting rotor 23, while the upper roller 25 cooperates with the auxiliary frame 19 to cause the drive wheels 20 and the conveyor 15 to properly cooperate, and the other leveling depth roller 26 is journalled upon an adjustable bracket 53 having arms secured to the main frame 14 and which is suspended in horizontal position by a rod 54. The depth of cut produced by the conveyor 15 is variable by adjusting a wing nut 55 coacting with a rod 56 connecting bracket 51 with the frame 19, and the weight 52 merely regulates the pressure on the conveyor 15 and roller 25.

The propelling motor 37 which is mounted upon the inner enlarged end of the main frame 14 and which is drivingly connected to the drive wheels 20 through the speed reducer 38, is also likewise connected to the inner end sprocket 16 of the conveyor 15 and to the blower 27 which is operable to remove ensilage 10 from the inner end of this conveyor and to deliver the same into the conduit 28, see FIGS. 1, 2 and 5. While the motor 37 and the blower 27 are revolvable with the conveyor 15 and drive wheels 20 about the central silo axis, the conduit 28 which is vertically movable to constantly maintain its ensilage receiving end in communication with the blower outlet, is fixed against rotation by suspension members 55 in a well-known manner, and this conduit and its suspension members are formed and disposed so as to permit unobstructed normal revolution of the ensilage unloading mechanism by a swivel joint 56.

When the improved silage unloading unit has been properly constructed and assembled within an ensilage laden silo as in FIG. 1, and the various parts have been adjusted for proper cooperation with the silo wall 11 and with the mass of ensilage 10 and discharge opening 12, the motor 37 may be operated to simultaneously positively drive the conveyor 15, the cutter 23, the blower 27, and the driving wheels 20. Rotation of the wheels 20 then causes the main and auxiliary frames 14, 19 to revolve about the central upright axis of the silo, while the three rollers 24, 25, 26 ride along the inner annular surface of the wall 11 to maintain the unit centralized, and the caster wheels 21, 22 coact with the ensilage 10 near the axis of revolution so as to support the weight of the motor 37 and of the mechanism driven thereby and which rests upon the inner platform end of the frame 14.

The advancing cutter 23 then travels along the inner surface of the wall 11 and the revolving blades 43 coact with the silage mass adjoining this wall to remove and throw the ensilage into the outer end of the path of inward advancement of the conveyor flights 18 carried by the lower radial stretch of the bodily revolving conveyor 15, and these flights constantly carry the ensilage removed from the top of the entire mass into the blower 27 which discharges the removed material from within the silo through the chute 28. When the volume of the confined ensilage 10 has been decreased sufficiently to lower the unloading unit beyond the reach of the discharge chute 28, the motor 37 may be stopped and the delivery spout may be lowered for cooperation with a lower opening 12 in the silo wall, but while the device is operating it functions automatically to uniformly remove ensilage throughout the entire top area of the mass.

From the foregoing detailed description of the construction and operation of the unit, it will be apparent that the present invention in fact provides an improved ensilage unloading assemblage which is simple and durable in structure and which may be readily adjusted and installed to cooperate with silos of various diameters. The improved cutting rotor 23 functions to effectively remove ensilage 10 from the inner surface of the wall 11 and from the area outwardly beyond the swinging end of the conveyor 15, and this conveyor normally receives the material removed by the rotor 23 and uniformly removes other ensilage from the remaining upper area of the mass and constantly delivers all of the removed material into the blower 27 which discharges the same through the stationary chute 28.

The caster wheels 21, 22 effectively support the major portion of the weight of the unit and are adapted to swivel and ride upon uneven ensilage near the central axis, while the three rollers 24, 25, 26 may be easily adjusted to maintain the unit properly centralized. The main and auxiliary frames 14, 19 besides simplifying the assemblage, also permit the conveyor 15 and the drive wheels 20 to tilt relative to each other and to float on the ensilage independently thereby insuring most effective driving of the various elements, and the mounting of the guide and leveling rollers 24, 25 upon the lower and upper frames 14, 19 respectively also insures most effective centralization of these frames relative to the silo axis. The improved unloader has proven highly satisfactory and successful in actual use, and has obviated most of the difficulties heretofore encountered with top unloaders.

It should be understood that it is not desired to limit this invention to the exact details of construction and operation of the various parts herein specifically shown and described, since various modifications within the scope of the appended claims may occur to persons skilled in the art.

We claim:

1. A silo unloader comprising, an elongated main frame radiating from and being revolvable generally about the central vertical axis of a silo, a radially extending conveyor pivotally suspended at its inner end to said main frame and being operable to transport ensilage radially inwardly toward said silo axis, a thrust absorbing guide roller carried on the outer end of said conveyor for bearing against the inner wall of said silo, a positive drive wheel disposed adjacent the outer end of and on each of the opposite sides of said main frame and conveyor, an elongated auxiliary frame oscillatably mounted on the outer end of said main frame and arranged generally transversely in respect thereto, said auxiliary frame having a swingable U-shape medial portion spanning and connected to the outer end of said conveyor for swinging therewith, said auxiliary frame also having a bracket secured thereto for swinging therewith, a leveling roller mounted on said bracket for bearing against and being held in position by the inner wall of said silo, whereby said leveling roller maintains said conveyor in a substantially level position regardless of the compactness of the ensilage.

2. A silo unloader of the type having a main frame radiating from and being revolvable generally about the central vertical axis of a silo, a radially extending conveyor pivotally suspended at its inner end to said main frame and being operable to transport ensilage radially inwardly toward said silo axis, a thrust absorbing guide roller carried on the outer end of said conveyor for bearing against the inner wall of said silo, and a traction wheel disposed on each of the opposite sides of the outer end of said main frame; the improvement residing in an elongated auxiliary frame swingably mounted on the outer end of said main frame and having a U-shaped medial portion spanning and connected to the outer vertically swingable end of said conveyor, a bracket secured to said auxiliary frame for swinging therewith, a leveling roller mounted on said bracket for bearing against the inner wall of said silo, whereby said leveling roller maintains said conveyor in a substantially level position regardless of the compactness of the ensilage.

3. A silo unloader of the type having an elongated main frame radiating from and being revolvable generally about the central vertical axis of a silo, a radially extending conveyor pivotally suspended at its inner end to said main frame and being operable to transport ensilage radially inwardly toward said silo axis, a thrust absorbing guide roller carried on the outer end of said conveyor for bearing against the inner wall of said silo, a positive drive wheel disposed adjacent the outer end of and on each of the opposite sides of said main frame and conveyor, and an elongated auxiliary frame swingably mounted on the outer end of said main frame and arranged generally transversely in respect thereto; the improvement residing in said auxiliary frame having a U-shaped medial portion spanning the outer vertically swingable end of said conveyor and connected thereto, a crank-shaped bracket secured intermediate its length on said auxiliary frame for swinging therewith, a leveling roller mounted on one end of said bracket for bearing against the inner wall of said silo, a counterbalancing weight on the other end of said bracket, and a connection between said auxiliary frame and said conveyor whereby said leveling roller maintains said conveyor in a substantially level position as the unloader revolves around the silo.

4. A silo unloader comprising, an elongated main frame radiating from and being revolvable generally about the central vertical axis of a silo, a radially extending conveyor pivotally suspended at its inner end to said main frame and being operable to transport ensilage radially inwardly toward said silo axis, a thrust absorbing guide roller carried on the outer end of said conveyor for bearing against the inner wall of said silo, a positive drive wheel disposed adjacent the outer end of and on each of the opposite sides of said main frame, an elongated auxiliary frame swingably mounted on the outer end of said main frame and having a U-shape medial portion spanning the outer vertically swingable end of said conveyor and connected thereto, a leveling roller carried by said auxiliary frame for bearing against the inner wall of said silo, whereby said leveling roller maintains said conveyor in a substantially level position.

5. A silo unloader of the type having a main frame revolvable generally about the central portion of a silo, a radially extending conveyor swingably mounted at its inner end to said main frame and adapted to transport ensilage radially inwardly toward said central portion, a thrust absorbing guide roller carried on the outer end of said conveyor for bearing against the inner wall of said silo, and a traction wheel disposed adjacent the outer end of and on each of the opposite sides of said main frame and conveyor; the improvement comprising, an elongated auxiliary frame swingably mounted to the outer end of said main frame and having a generally U-shape medial portion connected with and spanning the outer end of said conveyor, a leveling roller carried by said auxiliary frame for swinging therewith and for bearing against the inner wall of said silo, whereby said leveling roller maintains said conveyor in a substantially level position.

References Cited in the file of this patent

UNITED STATES PATENTS

| | | |
|---|---|---|
| 2,671,696 | McLean | Mar. 9, 1954 |
| 2,719,058 | Van Dusen | Sept. 27, 1955 |
| 2,788,247 | Chapman | Apr. 9, 1957 |
| 2,794,560 | Buschbom | June 4, 1957 |

OTHER REFERENCES

Publication: The McLean Silo Unloader, published by Silage Equipment, Inc., Wichita, Kansas (2 pages).